US012539257B2

(12) United States Patent
Jung

(10) Patent No.: US 12,539,257 B2
(45) Date of Patent: Feb. 3, 2026

(54) PILL DISPENSING APPARATUS HAVING NOTIFICATION FUNCTION

(71) Applicant: Hae Tae Jung, Gimpo-si (KR)

(72) Inventor: Hae Tae Jung, Gimpo-si (KR)

( * ) Notice: Subject to any disclaimer, the term of this patent is extended or adjusted under 35 U.S.C. 154(b) by 232 days.

(21) Appl. No.: 18/550,105

(22) PCT Filed: Mar. 16, 2022

(86) PCT No.: PCT/KR2022/003641
§ 371 (c)(1),
(2) Date: Sep. 12, 2023

(87) PCT Pub. No.: WO2022/203270
PCT Pub. Date: Sep. 29, 2022

(65) Prior Publication Data

US 2024/0173210 A1 May 30, 2024

(30) Foreign Application Priority Data

Mar. 26, 2021 (KR) ........................ 10-2021-0039462

(51) Int. Cl.
*A61J 7/00* (2006.01)
*A61J 7/04* (2006.01)

(52) U.S. Cl.
CPC ........... *A61J 7/0084* (2013.01); *A61J 7/0454* (2015.05); *A61J 2200/74* (2013.01); *A61J 2205/60* (2013.01)

(58) Field of Classification Search
CPC ..................................................... A61J 7/0084
USPC .............. 221/2, 97, 113, 119, 121, 133, 163
See application file for complete search history.

(56) References Cited

U.S. PATENT DOCUMENTS 10,633,847 B2 * 4/2020 Wood ...................... E03D 9/005
10,993,881 B1 * 5/2021 Karpman .............. A61J 7/0481
2005/0027603 A1 * 2/2005 Green ................ G01G 19/4144
705/22

(Continued)

FOREIGN PATENT DOCUMENTS

KR 10-2010-0030508 A 3/2010
KR 10-1355138 B 1/2014

(Continued)

OTHER PUBLICATIONS

International Search Report for International Application No. PCT/KR2022/003641 dated Jun. 30, 2022, ISA/KR.

*Primary Examiner* — Gene O Crawford
*Assistant Examiner* — Ayodeji T Ojofeitimi
(74) *Attorney, Agent, or Firm* — Sughrue Mion, PLLC

(57) ABSTRACT

A pill dispensing apparatus having a notification function according to the present invention comprises: a storage part that includes one or more storage boxes for storing different types of pills and discharges the pills from the storage boxes on the basis of combination formulas determined in advance for each user; a dispensing part that includes one or more dispensing boxes respectively corresponding to users and storing the discharged pills, pill sensors for detecting whether the pills have been placed in the dispensing boxes, and light source units for displaying first lights when the pill sensors detect the pills; and a conveying part for guiding the discharged pills to the dispensing boxes corresponding to the combination formulas through at least one ramp disposed in the dispensing boxes.

8 Claims, 6 Drawing Sheets

(56) References Cited

U.S. PATENT DOCUMENTS

| | | | | |
|---|---|---|---|---|
| 2006/0259187 | A1 | 11/2006 | Berg | |
| 2015/0090733 | A1* | 4/2015 | Park | A61J 7/0481 221/277 |
| 2016/0158107 | A1* | 6/2016 | Dvorak | A61J 7/0084 221/9 |
| 2016/0375201 | A1* | 12/2016 | Knaub | A61J 7/0084 221/131 |
| 2017/0046501 | A1* | 2/2017 | Coleman | A61J 7/0481 |
| 2018/0333335 | A1* | 11/2018 | Carson | G07F 17/0092 |
| 2022/0281672 | A1* | 9/2022 | Jehn | B65D 83/049 |

FOREIGN PATENT DOCUMENTS

| | | | |
|---|---|---|---|
| KR | 10-2018-0045149 | A | 5/2018 |
| KR | 10-2019-0010717 | A | 1/2019 |
| KR | 10-1953750 | A | 3/2019 |
| KR | 10-2019-0130870 | A | 11/2019 |

* cited by examiner

PILL DISPENSING APPARATUS HAVING NOTIFICATION FUNCTION

CROSS-REFERENCE TO RELATED APPLICATION

This application is a 371 U.S. national stage of PCT/KR2022/003641, filed Mar. 16, 2022, which claims the benefit of Korean Patent Application No. 10-2021-0039462, filed Mar. 26, 2021, the contents of each of which are incorporated herein by reference.

TECHNICAL FIELD

The present invention relates to a pill dispensing apparatus having a notification function, and more specifically, to a pill dispensing apparatus having a notification function that can automatically distribute pills based on combination formulas for multiple users, and confirm the dispensing status through the notification function.

BACKGROUND ART

Recently, the number of people taking medicines for a long period of time due to various diseases has been increasing. Even without illness, there is a growing number of people who consume a variety of health supplements, including vitamins.

Since people have to take such medicines according to the prescribed dosage, people either rely on memory, to determine whether they have taken their medication, or use alarm clocks to remind themselves of their medication time. However, depending on memory or using alarm clocks cannot guarantee regular intake of medicines.

Furthermore, a user might find taking various types of medicines cumbersome, in that a user has to open a plurality of pill boxes one by one and combine the pills manually.

To solve such disadvantages, previously developed solutions include day-by-day pill boxes storing daily medicine dosages, portable pill boxes holding pills for two to three days, and portable pill boxes with an alarm function.

However, such techniques still require manual sorting and combining of pills for a single intake, may not be suitable for multiple users, and due to limited storage space in pill boxes, may have a disadvantage in that it is difficult to cope with various intake patterns. For instance, if a user has to take multiple medicines at different times in the day, the user has to store the medicines in one place and rely on memory to select the right pill for each dosage time.

Meanwhile, in households in which a plurality of family members take various medicines, some of which may overlap, each family member needs day-by-day pill boxes or a portable pill box having an alarm function for the individual. As the number of pill boxes increases, inconvenience may be doubled.

DISCLOSURE

Technical Problem

Accordingly, the present invention has been made in view of the above-mentioned problems occurring in the related art, and it is an object of the present invention to provide a pill dispensing apparatus, which a plurality of users can use together, which can store various types of medicines, combine and offer prescribed medicines for each of the multiple members every set dosage time, and can provide a notification to inform a user of a medication time.

Technical Solution

To accomplish the above-mentioned objects, according to the present invention, there is provided a pill dispensing apparatus having a notification function including: a storage part comprising one or more storage boxes for storing different types of pills and discharging the pills from the storage boxes on the basis of a combination formula determined in advance for each user; a dispensing part comprising one or more dispensing boxes respectively corresponding to users and storing the discharged pills, pill sensors for detecting whether the pills have been placed in the dispensing boxes, and light source units for displaying first light when the pill sensors detect the pills; and a conveying part for guiding the discharged pills to the dispensing boxes corresponding to the combination formula through at least one ramp disposed in the dispensing box.

In an embodiment of the present invention, the combination formula includes an applicable target, intake time, and types and number of pills.

In an embodiment of the present invention, the pill sensor includes an electronic scale which detects weight, and the light source unit displays the first light when a sensing value measured by the electronic scale is the same as a pre-set sensing reference value based on the combination formula, and displays a second light different from the first light when the sensing value measured by the electronic scale is different from the sensing reference value.

In an embodiment of the present invention, the conveying part includes at least one sorter corresponding to each dispensing box, and the conveying part opens the sorter corresponding to the combination formula to guide the pills being conveyed to the dispensing box corresponding to the combination formula.

In an embodiment of the present invention, the sorter includes a gate formed on the upper portion of the corresponding dispensing box, and opens a path heading towards the dispensing box by raising the gate.

In an embodiment of the present invention, the sorter includes a first disc with an opening, and the conveying part rotates the first disc to connect the opening to the ramp guiding the pills to the dispensing box corresponding to the combination formula.

In an embodiment of the present invention, the pill dispensing apparatus further includes: a Bluetooth communication unit communicating with an external mobile device via Bluetooth, wherein the dispensing part transmits a Bluetooth signal to the external mobile device corresponding to the dispensing box when pills are stored in or discharged from the dispensing box, and the Bluetooth signal includes at least one of the following: user information, combination formula, dispensing time, discharge time, and dispensing review information, indicating whether the dispensed pills satisfy the combination formula.

In an embodiment of the present invention, the dispensing part further includes an NFC communication unit which acquires tag information stored in an NFC tag, and a locking mechanism. When the NFC tag corresponding to the dispensing box is tagged, the locking mechanism of the dispensing box is released, and the discharge time includes the time the NFC tag is tagged.

In an embodiment of the present invention, when the NFC tag is tagged but no pills are stored in the corresponding dispensing box, the storage part and the conveying part deliver the pills to the dispensing box based on the combination formula corresponding to the dispensing box.

Advantageous Effects

The pill dispensing apparatus having a notification function according to the present invention can store various types of pills, and can automatically provide the stored pills to multiple users according to different combination formulas.

Additionally, the pill dispensing apparatus according to the present invention can help a user be regular in taking medicines.

Furthermore, the pill dispensing apparatus according to the present invention can help prevention of overdose by adjusting the medication schedule by using statistical information on medication time, whether to take medicines, and so on.

MODE FOR INVENTION

Figure 1:
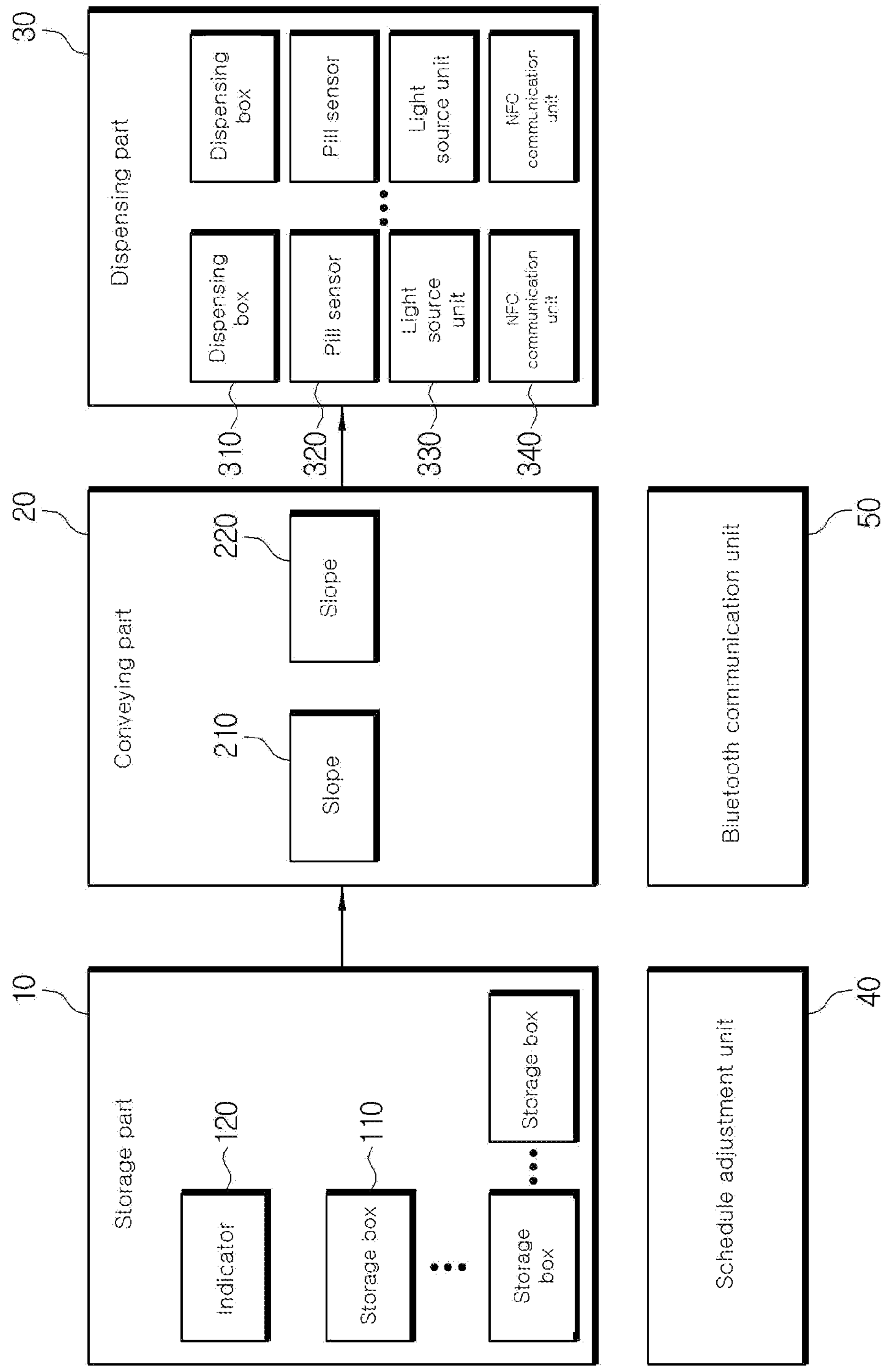
FIG. 1 is a block diagram illustrating a pill dispensing apparatus having a notification function according to an embodiment of the present invention.

Hereinafter, the present invention will be described in more detail with reference to the attached drawings. Identical components in the drawings are denoted by the same reference numerals, and redundant descriptions of identical components may be omitted.

Figure 2:
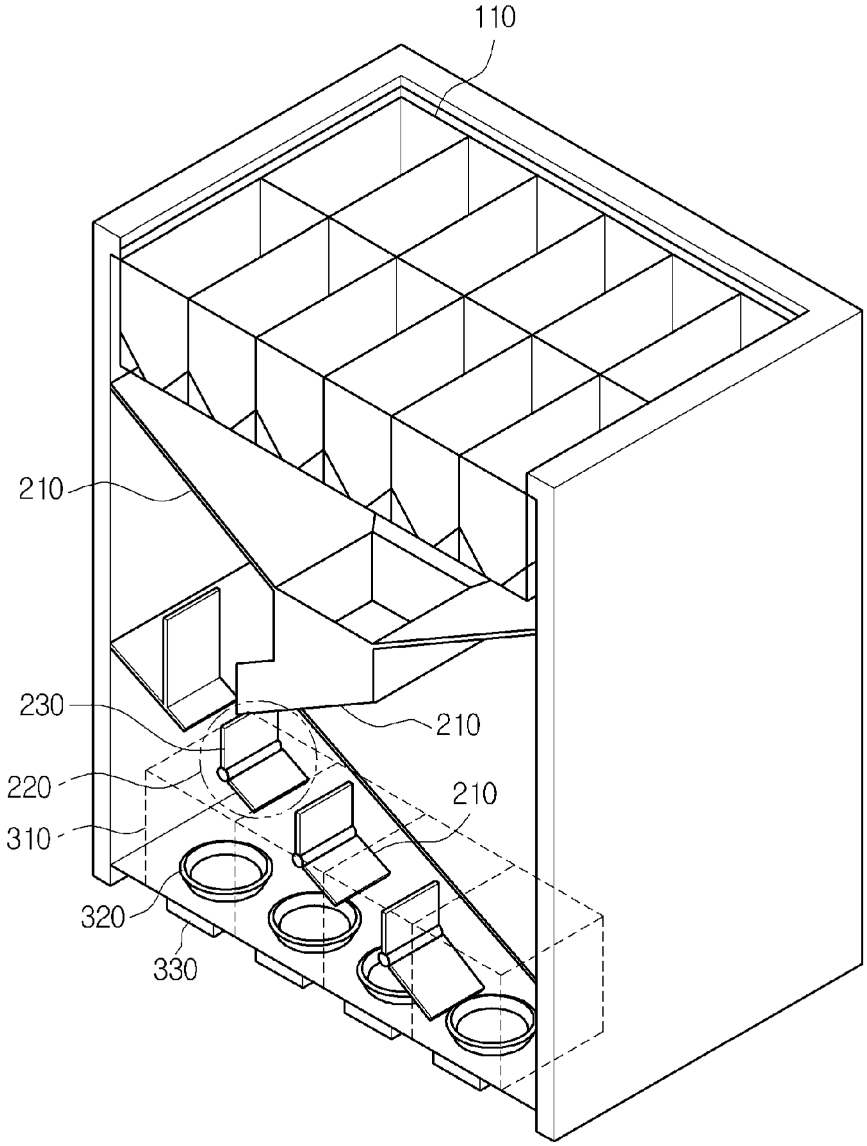
FIG. 2 is a conceptual diagram illustrating a structure of the pill dispensing apparatus with the notification function of FIG. 1.
Figure 3:
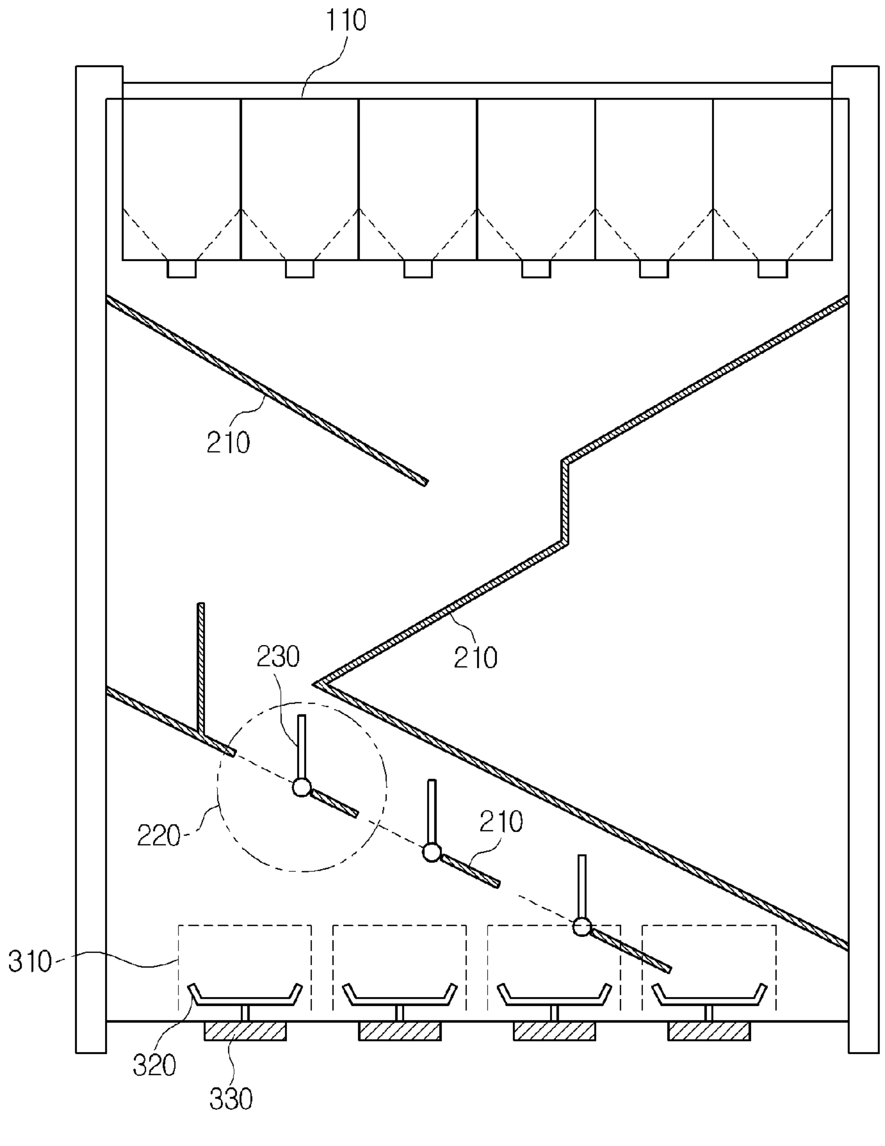
FIG. 3 is a conceptual diagram illustrating the structure of the pill dispensing apparatus with the notification function of FIG. 1.
Figure 4:
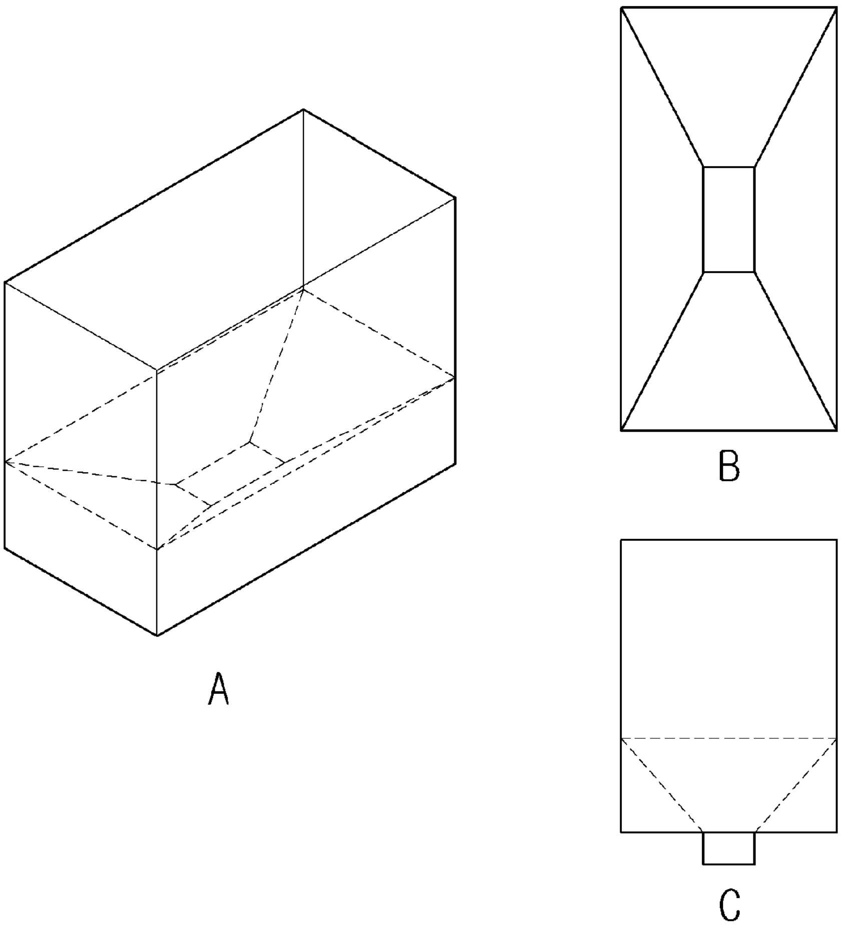
FIG. 4 represents perspective, plan, and front views of a storage box of FIG. 1.

FIG. 1 is a block diagram illustrating a pill dispensing apparatus having a notification function according to an embodiment of the present invention, FIG. 2 is a conceptual diagram illustrating a structure of the pill dispensing apparatus with the notification function of FIG. 1, FIG. 3 is a conceptual diagram illustrating the structure of the pill dispensing apparatus with the notification function of FIG. 1, and FIG. 4 represents perspective, plan, and front views of a storage box of FIG. 1.

Referring to FIGS. 1 through 4, the pill dispensing apparatus having a notification function according to an embodiment of the present invention may include a storage part 10, a conveying part 20, a dispensing part 30, a schedule adjustment unit 40, and a Bluetooth communication unit 50.

The storage part 10 can store various types of pills and discharge pills based on a predetermined combination formula for each user. Specifically, the storage part 10 may include at least one storage box 110 which stores different types of pills.

Here, the term pill refers to all types of solid medicines in the form of an independent mass for one dose, such as tablets, which are drugs made by compressing powdered or crystalline medicines into a certain shape, and capsules containing powdered or liquid drugs which dissolve in the body after a dose.

The combination formula may be predetermined for each user. The combination formula may include information on a target user, the dispensing box 310, types, quantity, and intake time of pills taken, and other related data.

Each storage box 110 can store pills of different types. Each storage box 110 can include a storage space capable of storing pills and a dispenser which can discharge pills one by one. Each storage box 110 can discharge the stored pills one by one according to the combination formula and convey the pill to the conveying part 20. Specifically, each storage box 110 can convey the stored pills, according to the intake time, types and the number of pills taken included in the combination formula, to the conveying part 20.

Referring to the perspective view (A), the plan view (B), and the front view (C) of FIG. 4, the storage space of the storage box 110 has a shape that narrows downward so that each pill can access the dispenser. The storage box 110 can be separated one by one from the storage part 10 for easy pill storage.

Though not illustrated, the dispenser can be configured such that pills are stored one by one in the aligned rotating storage space, and the pills located in the storage space aligned with the discharge hole drop down one by one through the discharge hole while the dispenser rotates. However, the present invention is not limited thereto, and various types of dispensers can be included.

The storage part 10 may further include an indicator 120. The indicator 120 can display drug information such as the name, storage date, and expiration date of the pills stored in the storage box 110. The storage part 10 may include as many indicators 120 as the number of storage boxes 110, and each indicator 120 can display the drug information of the pills stored in the corresponding storage box 110. Alternatively, the storage part 10 can display the drug information of the pills stored in the storage box 110 through a single indicator 120.

In one embodiment, the indicator 120 may include an electrokinetic display device with relatively low power consumption. Alternatively, the indicator 120 may include at least one of an LCD display, a plasma display panel, an organic light-emitting display, a micro LED display, and a MEMS type display.

The conveying part 20 can guide the pills discharged from the storage part 10 to the dispensing box 310 corresponding to the combination formula through at least one ramp 210 positioned on the dispensing box 310.

In one embodiment, the conveying part 20 may include at least one ramp 210 positioned on the dispensing box 310, and a sorter 220 corresponding to each dispensing box.

The ramp 210 can guide the pills discharged from the storage part 10 to the dispensing box 310 corresponding to the combination formula.

For this purpose, the ramp 210 may include a first ramp of a funnel shape to guide the pills discharged from the storage boxes 110, a second ramp tilted in the direction in which the dispensing box 310 is arranged, and a third ramp connecting the first ramp and the second ramp.

The pills discharged from the storage boxes 110 can pass through the first ramp, the third ramp, and the second ramp in order, and be transferred to the dispensing box 310 corresponding to the combination formula.

The conveying part 20 can open the sorter 220 corresponding to the combination formula to guide the pills being transferred to the dispensing box 310 corresponding to the combination formula.

Specifically, the sorter 220 may be formed on the second ramp of the ramp 210. The sorter 220 may be formed in the number equal to or less than the number of dispensing boxes 310 to form paths leading to each dispensing box 310.

For example, referring to FIGS. 2 and 3, in an embodiment including four dispensing boxes 310, the pill dispensing apparatus may include a first sorter 220 for forming a path heading toward the first dispensing box 310 from the left, a second sorter 220 for forming a path heading toward the second dispensing box 310, and a third sorter 220 for forming a path heading toward the third dispensing box 310. In this case, a path heading toward the fourth dispensing box 310 may be formed when all of the first to third sorters 220 are closed, so the fourth sorter can be omitted.

In one embodiment, each of the sorters 220 may include a gate 230 formed on the upper portion of the corresponding dispensing box 310. The sorter 220 can open a path heading towards the dispensing box 310 by raising the gate 230.

For example, to form a path heading to the first dispensing box 310, the gate 230 of the first sorter 220 can be raised.

To form a path heading to the second dispensing box 310, the gate 230 of the first sorter 220 can be lowered, and the gate 230 of the second sorter 220 can be raised.

To form a path heading to the third dispensing box 310, the gates 230 of the first and second sorters 220 can be lowered, and the gate 230 of the third sorter 220 can be raised.

To form a path heading to the fourth dispensing box 310, the gates 230 of the first, second, and third sorters 220 can be lowered.

The dispensing part 30 may include the dispensing box 310, a pill sensor 320, a light source unit 330, and an NFC communication unit 340.

The dispensing box 310 corresponds to each user, and can store pills discharged from the storage part 10 and passed through the conveying part 20. The dispensing part 30 may include at least one dispensing box 310 corresponding to each user.

The pill sensor 320 can detect whether the pills are stored in the dispensing box 310. The pill sensor 320 can be placed inside each dispensing box 310. That is, the dispensing part 30 can include as many pill sensors 320 as the number of dispensing boxes 310.

In one embodiment, the pill sensor 320 may include an electronic scale to detect weight, but is not limited thereto.

The light source unit 330 can display a first light when the pill sensor 320 detects a pill. The light source unit 330 may be located inside or outside each dispensing box 310. That is, the dispensing part 30 may include as many light source unit 330 as the number of dispensing boxes 310.

The light unit 330 can display a first light when the sensing value measured by the electronic scale is the same as a pre-set sensing reference value based on the combination formula. The light source unit 330 can display a second light different from the first light, when the sensing value measured by the electronic scale is different from the sensing reference value.

The sensing reference value may include a value previously measured using the electronic scale based on the type and number of the pills contained in the combination formula. The sensing value measured by the electronic scale and the sensing reference value can be compared considering an allowable error range.

For instance, if the sensing value measured by the electronic scale is smaller than the sensing reference value, it implies that a pill is missing differently from the combination formula, and in this case, the second light can be displayed.

Additionally, if the sensing value measured by the electronic scale is greater than the sensing reference value, it implies that an extra pill is contained differently from the combination formula, and in this case, a third light different from the second light can be displayed.

Through this, the user can verify whether the pill has been discharged according to the user's combination formula, and especially when taking various types of pills, the user can quickly realize whether a pill is missing or additionally contained.

Hereinafter, the pill dispensing apparatus having a notification function according to the present invention will be described through a hypothetical example.

In this example, the pill dispensing apparatus having a notification function may include twelve storage boxes 110 and can include four dispensing boxes 310.

The twelve storage boxes 110 can respectively store a silver men's multivitamin (A), a silver women's multivitamin (B), a men's multivitamin (C), a women's multivitamin (D), lutein (E), omega (F), taurine (G), iron (H), arginine (I), inositol (J), vitamin D (K), and vitamin C (L).

Out of the four dispensing boxes 310, the first dispensing box 310 may be assigned to a 70-year-old man. The second dispensing box 310 may be assigned to a 60-year-old woman. The third dispensing box 310 may be assigned to a 30-year-old woman. The fourth dispensing box 310 may be assigned to a 25-year-old man.

The combination formula may include a first combination formula, a second combination formula, a third combination formula, and a fourth combination formula corresponding to the four users.

The first combination formula can include information, such as (Applicable target) 70-year-old man, (Type and number of pills) one tablet of each, silver men's multivitamin (A), lutein (E), omega (F), taurine (G), and inositol (J), (Dosage time) 7 a.m.

The second combination formula can include information, such as (Applicable target) 60-year-old woman, (Type and number of pills) one tablet of each, silver women's multivitamin (B), lutein (E), omega (F), taurine (G), and vitamin D (K), (Dosage time) 8 a.m.

The third combination formula can include information, such as (Applicable target) 30-year-old woman, (Type and number of pills) one tablet of each, women's multivitamin (D), lutein (E), omega (F), taurine (G), and iron (H), (Dosage time) 9 a.m.

The fourth combination formula can include information, such as (Applicable target) 25-year-old man, (Type and number of pills) one tablet of each, men's multivitamin (C), lutein (E), omega (F), taurine (G), arginine (I), and vitamin C (L), (Dosage time) 10 a.m.

In the above-mentioned case, at 7 a.m., from the storage box 110 where silver men's multivitamin (A), lutein (E), omega (F), taurine (G), and inositol (J) are stored, the pills can be discharged one by one. The discharged pills can pass through the first ramp 210 and the third ramp 210 to enter the second ramp 210.

The second ramp 210 can raise the gate 230 of the first sorter 220 to form a path heading towards the first dispensing box 310 corresponding to the first combination formula. The discharged pills can pass through the first sorter 220 and be stored in the first dispensing box 310.

The pill sensor 320 of the first dispensing box 310 can measure the weight of the stored pills. The light source unit 330 of the first dispensing box 310 can display the first light when the sensing value measured by the pill sensor 320 is the same as the pre-determined first sensing reference value based on the first combination formula, can display the second light when the sensing value is smaller than the first sensing reference value, and can display the third light when the sensing value is larger than the first sensing reference value. Subsequently, when the 70-year-old man removes the pills from the first dispensing box 310, the light source unit 330 can be turned off.

At 8 a.m., from the storage box 110 in which silver women's multivitamin (B), lutein (E), omega (F), taurine (G), and vitamin D (K) are stored, the pills can be discharged one by one. The discharged pills can pass through the first ramp 210 and the third ramp 210 to enter the second ramp 210.

The second ramp 210 can lower the gate 230 of the first sorter 220 and raise the gate 230 of the second sorter 220 to form a path heading towards the second dispensing box 310 corresponding to the second combination formula. The discharged pills can pass through the second sorter 220 and be stored in the second dispensing box 310.

The pill sensor 320 of the second dispensing box 310 can measure the weight of the stored pills. The light source unit 330 of the second dispensing box 310 can display the first light when the sensing value measured by the pill sensor 320 is the same as the pre-determined second sensing reference value based on the second combination formula, can display the second light when the sensing value is smaller than the second sensing reference value, and can display the third light when the sensing value is larger than the second sensing reference value. Subsequently, when the 60-year-old woman removes the pills from the second dispensing box 310, the light source unit 330 can be turned off.

At 9 a.m., from the storage box 110 in which women's multivitamin (D), lutein (E), omega (F), taurine (G), and iron (H) are stored, the pills can be discharged one by one. The discharged pills can pass through the first ramp 210 and the third ramp 210 to enter the second ramp 210.

The second ramp 210 can lower the gates 230 of both the first and second sorters 220 and raise the gate 230 of the third sorter 220 to form a path heading towards the third dispensing box 310 corresponding to the third combination formula. The discharged pills can pass through the third sorter 220 and can be stored in the third dispensing box 310.

The pill sensor 320 of the third dispensing box 310 can measure the weight of the stored pills. The light source unit 330 of the third dispensing box 310 can display the first light when the sensing value measured by the pill sensor 320 is the same as the pre-determined third sensing reference value based on the third combination formula, can display the second light when the sensing value is smaller than the third sensing reference value, and can display the third light when the sensing value is larger than the third sensing reference value. Subsequently, when the 30-year-old woman removes the pills from the third dispensing box 310, the light source unit 330 can be turned off.

At 10 a.m., from the storage box 110 containing man multivitamin (C), lutein (E), omega (F), taurine (G), arginine (I), and vitamin C (L), the pills can be discharged one by one. The discharged pills can pass through the first ramp 210 and the third ramp 210 and enter the second ramp 210.

The second ramp 210 can lower the gates 230 of the first, second, and third sorters 220 to form a path heading to the fourth dispensing box 310 corresponding to the fourth combination formula. The discharged pills can be stored in the fourth dispensing box 310 after passing through the second ramp.

The pill sensor 320 of the fourth dispensing box 310 can measure the weight of the stored pills. The light source unit 330 of the fourth dispensing box 310 can display the first light when the sensed value measured by the pill sensor 320 is the same as the pre-set fourth sensing reference value based on the fourth combination formula, can display the second light when the sensing value is less than the fourth sensing reference value, and can display the third light when the sensing value is greater than the fourth sensing reference value. Subsequently, when a 25-year-old man removes pills from the fourth dispensing box 310, the light source unit 330 can be turned off.

The Bluetooth communication unit 50 can communicate with an external mobile device (e.g., smartphone) using the Bluetooth protocol. The Bluetooth communication unit 50 may include a Bluetooth module of the Bluetooth low energy method, but is not limited thereto, and can include Bluetooth communication modules of various standards.

The dispensing part 30 can transmit a Bluetooth signal to s user's mobile device corresponding to the dispensing box 310 through the Bluetooth communication unit 50 when pills are stored in or discharged from the dispensing box 310.

The Bluetooth signal may include user information, combination formula, dispensing time, discharge time, and dispensing review information, indicating whether the dispensed pills satisfy the combination formula.

Here, the user information and the combination formula included in the Bluetooth signal can include applicable target information and information about the type, number, and intake time of the pills, which are included in the combination formula corresponding to the dispensing box 310. The dispensing time may include the time when the pills are stored in the dispensing box 310. The discharge time may include the time when pills are discharged from the dispensing box 310. The dispensing review information can be generated by comparing the sensing value measured by the pill sensor 320 with the sensing reference value.

In one embodiment, the dispensing part 30 can further include an NFC communication unit 340 and a locking mechanism. The NFC communication unit can communicate using the NFC communication method. The NFC communication unit 340 may include an NFC reader module capable of reading information contained in NFC an adjacent tag by a non-contact method. The NFC communication unit 340 may be located outside the dispensing box 310. That is, the dispensing part 30 may include as many NFC communication units 340 and locking mechanisms as the dispensing boxes 310.

When an NFC tag corresponding to the dispensing box 310 is tagged to the NFC communication unit 340, the dispensing part 30 can unlock the locking mechanism (not shown) of the dispensing box 310. In this case, the discharge time of the Bluetooth signal may include the time when the NFC tag is tagged. As described above, since including the locking mechanism which can release the locked state using an NFC tag, the dispensing part 30 can prevent accidental intake of another user's medicine.

In one embodiment, when the NFC tag has been tagged but no pills are stored in the corresponding dispensing box 310, the storage part 10 and the conveying part 20 can transfer pills to the dispensing box 310 based on the corresponding combination formula. In this case, the dispensing time of the Bluetooth signal may include the time when the NFC tag is tagged.

The schedule adjustment unit 40 can adjust the time pills are dispensed by the storage part 10, the conveying part 20, and the dispensing part 30. The schedule adjustment unit 40 may store a predetermined combination formula for each user. Based on the intake time included in the combination formula, the schedule adjustment unit 40 can adjust the time pills are dispensed by the storage part 10, the conveying part 20, and the dispensing part 30.

The schedule adjustment unit 40 can store statistical data for each user, comprising the time pills are discharged from the dispensing box 310. For example, the discharge time may include the time when the pill sensor 320 measures a sensing value of 0. Alternatively, the discharge time may include the time when the NFC tag is tagged.

Based on the statistical data for each user, the schedule adjustment unit 40 can change the intake time included in the combination formula. The schedule adjustment unit 40 can advance or delay the intake time based on user-specific statistical data.

For example, when the analysis of statistical data including the discharge time for a user corresponding to the first dispensing box 310 shows that the average discharge time is on average one hour later than the intake time of the combination formula, the schedule adjustment unit 40 can change the intake time of the combination formula corresponding to the first dispensing box 310 to be delayed by one hour.

Alternatively, when the analysis of statistical data including the discharge time for a user corresponding to the second dispensing box 310 shows that the average discharge time is on average two hours earlier than the intake time of the combination formula, the schedule adjustment unit 40 can change the intake time of the combination formula corresponding to the second dispensing box 310 to be advanced by two hours.

After dispensing of pills, in a case in which there is any dispensing box 310 from which the pills are not discharged until the intake time of the next day, the schedule adjustment unit 40 can control the operation of the storage part 10 and the conveying part 20 so that pills are not dispensed to the dispensing box 310 from which the pills are not discharged.

For the safe storage of pills, it is necessary to maintain the humidity inside the pill dispensing apparatus having a notification function at a predetermined level or below. Therefore, the pill dispensing apparatus having a notification function according to an embodiment of the present invention may further include a humidity removal unit 60.

The humidity removal unit 60 can absorb the internal humidity of the storage part 10, the conveying part 20, and the dispensing part 30 using desiccants such as silica gel. Alternatively, the humidity removal unit 60 can remove the internal humidity of the storage part 10, the conveying part 20, and the dispensing part 30 using a method of converting the internal humidity into a liquid state and discharging the liquid-state humidity. Furthermore, to maintain the humidity inside the device at the predetermined level or below, the interior of the pill dispensing apparatus may be entirely or partially sealed. For example, the pill dispensing apparatus may have a sealed structure inside excluding the opening and closing device for pill input of the storage box 110 and the opening and closing devices for pill discharge of the dispensing box 310. The opening and closing devices of the storage box 110 and the dispensing box may include a structure such as a rubber packing to ensure sealing when being closed.

Figure 5:
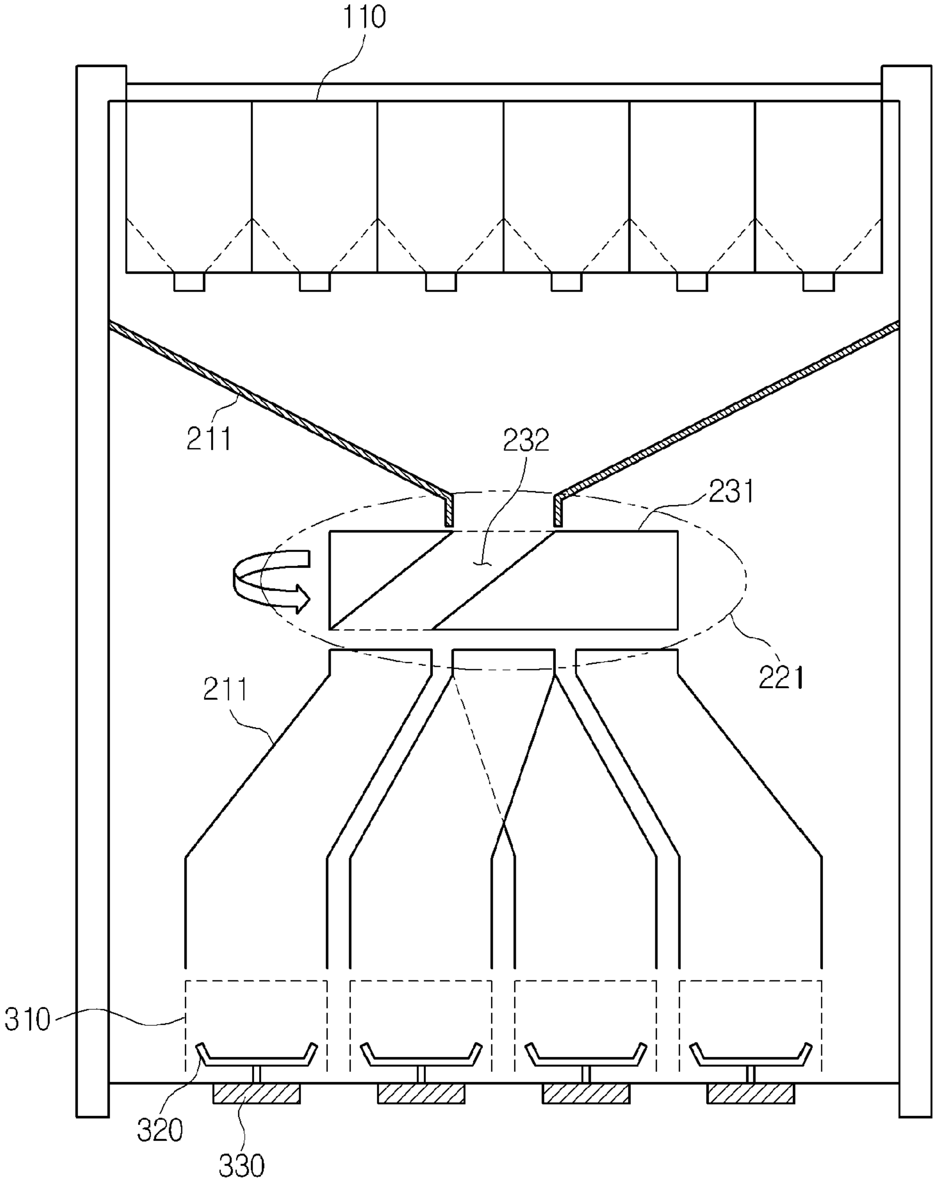
FIG. 5 is a conceptual diagram illustrating a structure of a pill dispensing apparatus having a notification function according to another embodiment of the invention.
Figure 6:
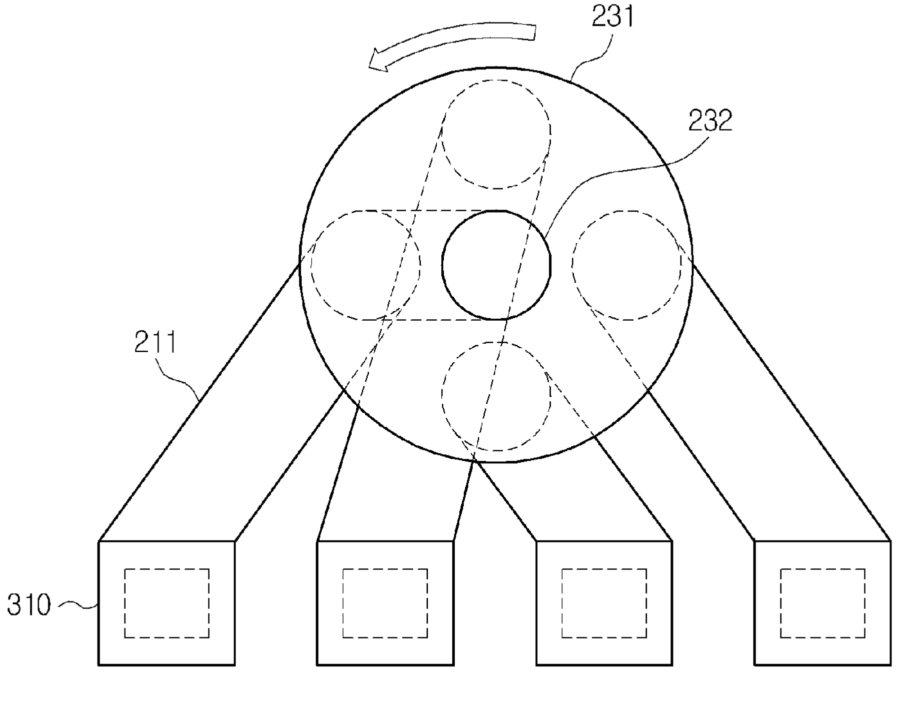
FIG. 6 is a conceptual diagram illustrating a conveying part of FIG. 5.

FIG. 5 is a conceptual diagram illustrating a structure of a pill dispensing apparatus having a notification function according to another embodiment of the invention, and FIG. 6 is a conceptual diagram illustrating a conveying part of FIG. 5.

Referring to FIGS. 5 and 6, a pill dispensing apparatus with a notification function according to another embodiment of the present invention, except for the conveying part 20, has the same configuration as the pill dispensing apparatus with a notification function illustrated in FIGS. 1 through 4, so detailed descriptions of other components excluding the conveying part 20 will be omitted.

The conveying part 20 can guide the pills discharged from the storage part 10 to the dispensing box 310 corresponding to the combination formula through at least one ramp 211.

Each ramp 211 can guide the pills discharged from each storage box 110 to the dispensing box 310 corresponding to the combination formula.

For the above, the ramp 211 may include a funnel-shaped first ramp guiding the pills discharged from the storage boxes 110, and at least one second ramp heading to each dispensing box 310. Here, the number of the second ramps may be the same as the number of the dispensing boxes 310.

The pills discharged from the storage boxes 110 can be conveyed to the dispensing box 310 corresponding to the combination formula by sequentially passing through the first ramp and the second ramp.

The conveying part 20 can open a sorter 221 corresponding to the combination formula and guide the pills being conveyed to the dispensing box 310 corresponding to the combination formula.

Specifically, the sorter 221 can be formed between the first ramp and the second ramp. The sorter 221 may form a path between the first ramp and the second ramp to make the pills head towards each dispensing box 310.

In one embodiment, the sorter 221 may include a first disc 231 with an opening 232. The conveying part 20 can rotate the first disc 231 to connect the opening 232 to one of the second ramps. Since the conveying part 20 can rotate the first disc 231 to connect the opening 232 to one of the second ramps guiding the pills to the dispensing box 310, the conveying part 20 can ultimately form a path leading to the dispensing box 310 corresponding to the combination formula.

The opening 232 may have a shape that obliquely penetrates the first disc 231. For example, an entrance of the opening 232 can be located at the center of the top surface of the first disc 231, and an exit of the opening 232 can be located at the edge of the bottom surface opposite to the top surface of the first disc 231.

To form a path heading to the first dispensing box 310, the sorter 221 can rotate the first disc 231 so that the opening 232 overlaps with an entrance of the second ramp connected to the first dispensing box 310. In other words, to form a path heading to the first dispensing box 310, the sorter 221 can rotate the first disc 231 so that the exit of the opening 232 overlaps with the entrance of the second ramp connected to the first dispensing box 310.

To form a path heading to the second dispensing box 310, the sorter 221 can rotate the first disc 231 so that the opening 232 overlaps with the entrance of the second ramp connected to the second dispensing box 310. In other words, to form a path heading to the second dispensing box 310, the sorter 221 can rotate the first disc 231 so that the exit of the opening 232 overlaps with the entrance of the second ramp connected to the second dispensing box 310.

To form a path heading to the third dispensing box 310, the sorter 221 can rotate the first disc 231 so that the opening 232 overlaps with the entrance of the second ramp connected to the third dispensing box 310. In other words, to form a path heading to the third dispensing box 310, the sorter 221 can rotate the first disc 231 so that the exit of the opening 232 overlaps with the entrance of the second ramp connected to the third dispensing box 310.

To form a path heading to the fourth dispensing box 310, the sorter 221 can rotate the first disc 231 so that the opening 232 overlaps with the entrance of the second ramp connected to the fourth dispensing box 310. In other words, to form a path heading to the fourth dispensing box 310, the sorter 221 can rotate the first disc 231 so that the exit of the opening 232 overlaps with the entrance of the second ramp connected to the fourth dispensing box 310.

Although the present invention has described with reference to the above embodiments, it will be understood by those of ordinary skill in the art that various modifications and equivalents may be made without deviating from the spirit or scope of the invention described in the claims.

The invention claimed is:

1. A pill dispensing apparatus having a notification function comprising:

a storage part comprising one or more storage boxes for storing different types of pills and discharges the pills from the storage boxes on the basis of a combination formula determined in advance for each user;

a dispensing part comprising one or more dispensing boxes respectively corresponding to users and storing the discharged pills, pill sensors for detecting whether the pills have been placed in the dispensing boxes, and light source units for displaying first light when the pill sensors detect the pills;

a conveying part for guiding the discharged pills to the dispensing boxes corresponding to the combination formula through at least one ramp disposed in the dispensing box; and wherein the conveying part includes at least one sorter corresponding to each dispensing box, and wherein the conveying part opens the sorter corresponding to the combination formula to guide the pills being conveyed to the dispensing box corresponding to the combination formula.

2. The pill dispensing apparatus according to claim 1, wherein the sorter includes a gate formed on the upper portion of the corresponding dispensing box, and opens a path heading towards the dispensing box by raising the gate.

3. The pill dispensing apparatus according to claim 1, wherein the sorter includes a first disc with an opening, and wherein the conveying part rotates the first disc to connect the opening to the ramp guiding the pills to the dispensing box corresponding to the combination formula.

4. The pill dispensing apparatus according to claim 1, wherein the combination formula includes an applicable target, intake time, and types and number of pills.

5. The pill dispensing apparatus according to claim 1, wherein the pill sensor includes an electronic scale which detects weight, and wherein the light source unit displays the first light when a sensing value measured by the electronic scale is the same as a pre-set sensing reference value based on the combination formula, and displays a second light different from the first light when the sensing value measured by the electronic scale is different from the sensing reference value.

6. The pill dispensing apparatus according to claim 1, further comprising:

a Bluetooth communication unit communicating with an external mobile device via Bluetooth, wherein the dispensing part transmits a Bluetooth signal to the external mobile device corresponding to the dispensing box when pills are stored in or discharged from the dispensing box, and wherein the Bluetooth signal includes at least one of the following: user information, combination formula, dispensing time, discharge time, and dispensing review information, indicating whether the dispensed pills satisfy the combination formula.

7. The pill dispensing apparatus according to claim 6, wherein the dispensing part further includes an NFC communication unit which acquires tag information stored in an NFC tag, and a locking mechanism, wherein when the NFC tag corresponding to the dispensing box is tagged, the locking mechanism of the dispensing box is released, and wherein the discharge time includes the time the NFC tag is tagged.

8. The pill dispensing apparatus according to claim 7, wherein when the NFC tag is tagged but no pills are stored in the corresponding dispensing box, the storage part and the conveying part deliver the pills to the dispensing box based on the combination formula corresponding to the dispensing box.

* * * * *